June 30, 1970  G. F. O'CALLAGHAN  3,518,472
SPEED CONTROL APPARATUS WITH EDDY CURRENT CLUTCH AND BRAKE MEANS
Filed Aug. 25, 1967  2 Sheets-Sheet 1

United States Patent Office 3,518,472
Patented June 30, 1970

3,518,472
SPEED CONTROL APPARATUS WITH EDDY
CURRENT CLUTCH AND BRAKE MEANS
Gerald F. O'Callaghan, Kenosha, Wis., assignor to Eaton
Yale & Towne, Inc., Cleveland, Ohio, a corporation
of Ohio
Filed Aug. 25, 1967, Ser. No. 663,370
Int. Cl. H02k 49/04; H02p 15/00
U.S. Cl. 310—95                              7 Claims

ABSTRACT OF THE DISCLOSURE

Apparatus is disclosed for maintaining the speed of the output member of an eddy current coupling at a preselected level. The coupling includes a clutch winding which, when energized, applies torque from a driving member to the output member and includes also a brake winding which, when energized, applies a braking torque to the output member. An A.C. tachometer generator is driven by the output member of the coupling and the A.C. signal generated thereby is rectified and partially filtered to provide a composite feedback signal having a D.C. component, the amplitude of which varies as a function of the speed of the output member, and an A.C. rider wave. This composite feedback signal is mixed with a D.C. reference voltage which represents the preselected speed level thereby to obtain a composite error signal having a D.C. component which varies as a function of the deviation of the actual speed of the output member from the preselected level and an A.C. component the waveform of which has at least one sloped portion. The composite error signal controls a pair of amplifiers which are operated in a switching mode. One of the amplifiers applies a predetermined source voltage across the clutch winding when the composite error signal exceeds a first preselected threshold and the other applies a predetermined source voltage across the brake winding when the composite error signal falls below a second preselected threshold. Accordingly, the average voltages applied to the windings vary as respective functions of the D.C. component of the composite error signal thereby maintaining the speed of the output member at the preselected level.

BACKGROUND OF THE INVENTION

This invention relates to speed control apparatus and more particularly to such apparatus which is operative to control the speed of the output member of an electromagnetic rotary coupling.

In certain applications, e.g., in various winding operations and in textile machinery, it is often desired to precisely control the speed of a load which may alternately tend to overrun or underrun the desired speed. To maintain the desired speed with such a load it is thus necessary to be able to apply torque in either direction. For this purpose, there have been developed eddy current couplings which include both a clutch winding which, when energized, applies a driving torque to an output member and a brake winding which, when energized, applies a braking torque to the output member. In either case the torque applied varies substantially as a linear function of the current applied to the respective winding. To obtain precise speed control, it is preferred that the windings be subjected to proportional control, that is, the degree of energization of each winding should vary as a function of the deviation of the actual speed of the output member from the desired speed. To obtain proportional control of a pair of such windings, prior art systems have employed separate power modulating systems for each of the windings. These power modulating systems are typically of the time division or phase-angle modulation type and a common disadvantage is that each modulation system requires a respective means for applying an A.C. rider wave on a D.C. error signal which varies the duty cycle.

SUMMARY OF THE INVENTION

Among the several objects of the present invention may be noted the provision of speed control apparatus which will maintain precisely at a preselected level the speed of the output member of an electromagnetic rotary coupling of the type which includes a first winding for applying torque in one direction and a second winding for applying torque in the opposite direction; the provision of such apparatus in which the means for modulating the power to the two windings employ many components in common; the provision of such apparatus which is highly reliable; and the provision of such apparatus which is relatively simple and inexpensive. Other objects and features will be in part apparent and in part pointed out hereinafter.

Briefly, apparatus according to this invention is operative to maintain the speed of the output member of an electromagnetic rotary coupling at a preselected level, the coupling having a first winding which when energized applies torque in one direction to the output member and a second winding which when energized applies torque in the opposite direction to that member. The apparatus includes means for providing a composite error signal having a D.C. component which varies as a function of the deviation of the actual speed of the output member from the preselected level and an A.C. component comprising a repetitive waveform having at least one portion thereof which is sloped. Means are provided for applying a predetermined source voltage across the first winding when the composite error signal exceeds a first preselected threshold and for applying a predetermined source voltage across the second winding when the composite signal falls below a second preselected threshold. Accordingly, the average voltages applied to the windings vary as respective functions of the D.C. component of the composite error signal thereby to maintain the speed of the output member at the preselected level.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
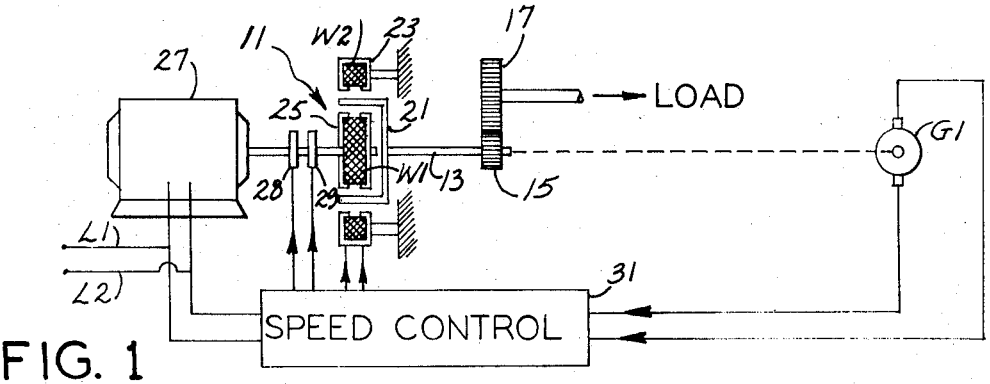
FIG. 1 is a diagrammatic illustration, partially in section, of a drive system including an eddy current coupling, the output speed of which is controlled by speed control apparatus according to this invention.

Referring now to the overall illustrating of a drive system shown in FIG. 1, there is indicated at 11 generally an eddy current coupling of the type which is adapted to apply either a driving torque or a braking torque to an output member or shaft 13. Shaft 13 is coupled to a load whose speed is to be controlled, e.g., by means of gears 15 and 17. Coupling 11 is essentially conventional and includes a rotatable inductor drum 21 which is mounted on the output shaft 13 and which constitutes the driven member, a stationary braking field member 23 having a brake winding W2 which, when energized, applied a braking torque to the inductor drum 21 by inducing eddy currents therein, and a driving field member 25 which is rotated by a main drive motor 27 and which includes a clutch winding W1 which, when energized, applies a driving torque to the inductor drum 21, also by inducing eddy currents therein. Winding W1 may be energized through slip rings as indicated at 28 and 29.

Output shaft 13 also drives an A.C. tachometer generator G1 which is operative to provide an A.C. signal the amplitude of which varies substantially proportional to the speed of shaft 13. The frequency of this A.C. signal also varies substantially in proportion to that speed. The A.C. signal provided by tachometer generator G1 is supplied to a speed control circuit indicated generally at 31. Speed control circuit 31 is operative, as explained in greater detail hereinafter, to variably energize windings W1 and W2 in response to variations in speed in the shaft 13 as sensed by generator G1 thereby to maintain the speed of the shaft substantially at a preselected level. While an eddy current brake has been illustrated as a means for applying torque in a direction opposite the principal driving torque in the embodiment shown, an alternative is to use second driving field member which is rotated in the opposite direction. In this way speed of rotation in both directions can be produced and controlled.

Figure 2:
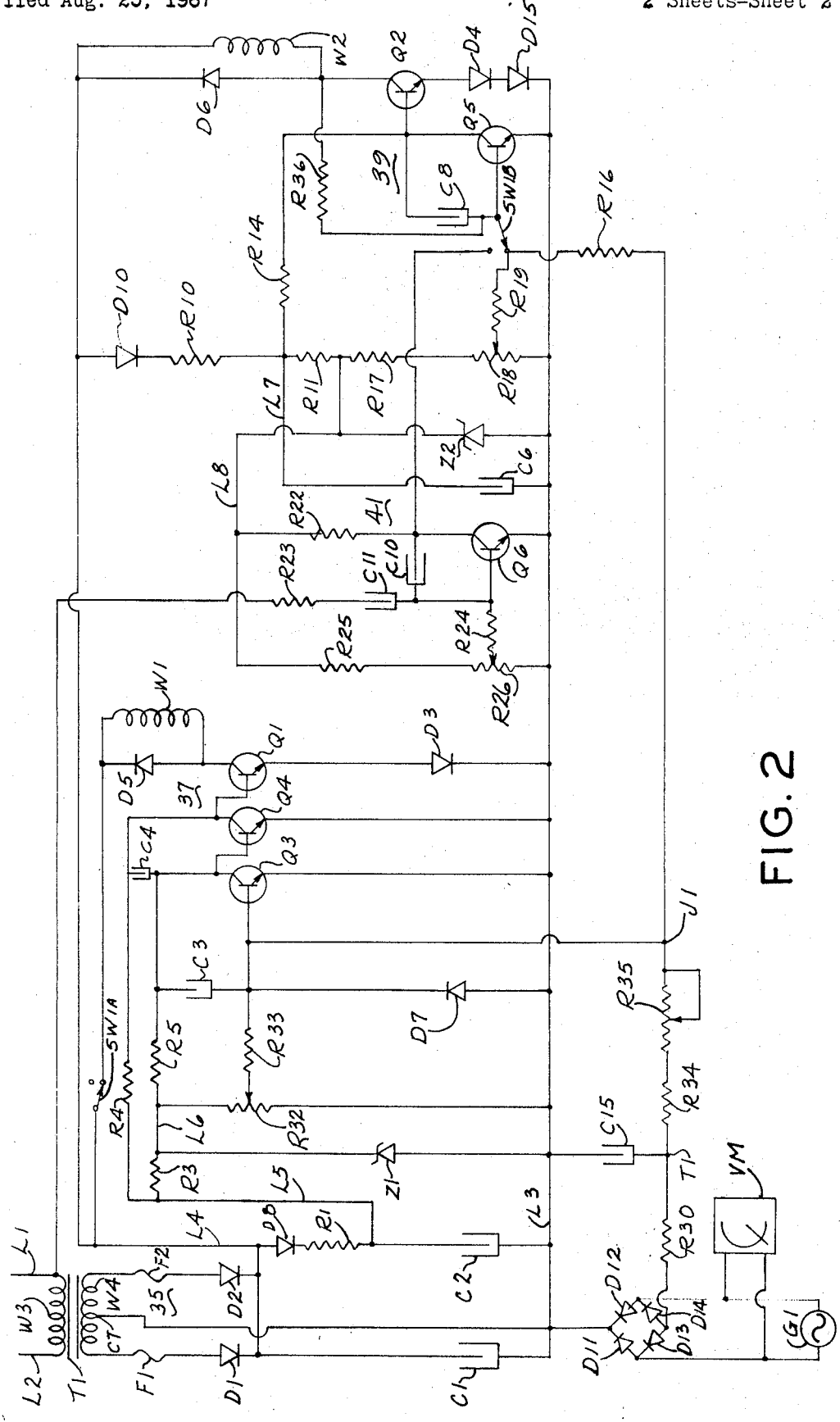
FIG. 2 is a schematic circuit diagram of the speed control apparatus.

Referring now to FIG. 2, direct current for energizing the clutch and brake windings is provided by a D.C. power supply indicated generally at 35. Power supply 35 includes a transformer T1 for reducing the line voltage to a level suitable for semiconductor circuitry. Transformer T1 includes a primary winding W3 which is connected across a pair of A.C. source leads L1 and L2 and a secondary winding W4 having a center tap CT. Center tap CT is connected to a lead L3 which constitutes local ground. The opposite ends of winding W4 are connected, through respective fuses F1 and F2 and respective diodes D1 and D2, to a filter capacitor C1 thereby to provide direct current to a lead L4 which is thus maintained at a positive voltage with respect to the ground lead L3.

One end of the brake winding W2 is connected directly to lead L4 and one end of the clutch winding W1 is connected to lead L4 through one switch section SW1A of a double-pole double throw switch. The other end of winding W1 is connected to the ground lead L3 through the collector-emitter circuit of a power transistor Q1 and diode D3 and the other end of winding W2 is connected to the ground lead L3 through the collector-emittter circuit of a power transistor Q2 and a pair of diodes D4 and D15. As is explained in greater detail hereinafter, each of the transistors Q1 and Q2 is operated in a switching mode in which the transistor is either turned fully on so as to apply the full source voltage across the respective winding or is cut off so that substantially no voltage is applied from the source to the winding. The voltage drops provided by the diodes D3, D4 and D15 aid in reverse biasing the respective transistors during the cut off states. As the windings W1 and W2 constitute inductive loads, they are shunted by respective diodes D5 and D6 to suppress inductive transients and to permit a current flowing in the respective winding to continue flowing between applications of the source voltage, such a current being thus damped or diminished substantially only by resistive dissipation within the respective winding. As is understood by those skilled in the art, the torque exerted on the inductor drum 21 by either winding when so connected varies as a function of the current flowing in the respective winding and thus varies essentially as a function of the average voltage applied rather than as a function of the instantaneous voltage.

Transistor Q1 is driven by a pair of transistors Q3 and Q4, transistors Q3, Q4 and Q1 being connected in that order as a cascade, direct-coupled amplifier designated generally as 37. Current for supplying the amplifying stages comprising transistors Q3 and Q4 is obtained from lead L4 through a diode D8 and is additionally filtered by a resistor R1 and a capacitor C2 to provide relatively smooth source of D.C. at a supply lead L5. Current from lead L5 is also applied, through a dropping resistor R3, to a Zener diode Z1 to provide at a lead L6 a regulated voltage source.

The emitters of transistors Q3 and Q4 are connected directly to the ground lead L3. The collector of transistor Q4 is connected to supply lead L5 through a load resistor R4 and the collector of transistor Q3 is connected to a lead L6 through a load resistor R5. The collector of transistor Q3 is connected to the base of transistor Q4 and the collector of transistor Q4 is connected to the base of transistor Q1 to provide direct coupling between cascaded stages. The collector of transistor Q4 is connected to its base through a capacitor C3 for suppressing high frequency transients. As is understood by those skilled in the art, an amplifier such as that indicated at 37 provides high gain and the output transistor Q1 tends to switch abruptly from a saturated state to a cut off state when the input signal applied to the base of input transistor Q3 passes a predetermined threshold. In amplifier 37 the source voltage is applied to the clutch winding when the signal applied to the base of transistor Q3 is positive and forward biases that transistor into conduction. Conversely, when the voltage at the base of transistor Q3 is negative, the output transistor Q1 is cut off and the source voltage is withdrawn from the clutch winding. A diode D7 connecting the base of transistor Q3 to ground protects it from possibly damaging reverse biasing.

Power transistor Q2 is driven by a single transistor Q5. Current for energizing the circuitry associated with driving transistor Q5 is obtained from lead L4 through a diode D10 and is filtered by a resistor R10 and a capacitor C6 to provide a source of additionally filtered current at a supply lead L7. Current from lead L7 is applied, through a dropping resistor R11, to a Zener diode Z2 to provide at a lead L8 a regulated voltage source. The emitter of transistor Q5 is connected to the ground lead L3 and its collector is connected, through a load resistor R14, to supply lead L7. The collector of transistor Q5 is also connected to its base terminal through a capacitor C8 for suppressing high frequency transients. The collector of transistor Q5 is directly coupled to the base of transistor Q2. A resistor R36 which is connected from the collector of transistor Q2 to the base of transistor Q5 provides a measure of positive feedback to ensure that transistors Q2 and Q5 switch efficiently. Transistors Q5 and Q2 thus comprise a two-stage, direct-coupled amplifier, designated generally as 39.

As with amplifier 37 comprising transistors Q3, Q4 and Q1, the gain of the amplifier 39 is sufficinetly high that the output transistor Q2 tends to turn either fully on or fully off when the input voltage applied to the base of transistor Q5 passes a respective predetermined threshold. However, since this amplifier comprises only two transistors, its response will be of opposite phase with respect to the response of the amplifier comprising transistors Q1, Q3 and Q4 with respect to similar input signals. In other words, when the voltage applied to the base of transistor Q5 is positive, transistor Q5 will be turned on thereby turning off transistor Q2 and cutting off the supply voltage from the brake winding W2. Conversely, when the applied voltage is negative, the transistor Q5 is turned off thereby turning on the transistor Q2 and causing the full source voltage to be applied to the brake winding.

The base of transistor Q5 is connected to the common terminal of a double-throw switch section SW1B which, with the switch section SW1A, constitutes the double-pole, double-throw switch mentioned previously. When the switch section SW1B is in the position shown in FIG. 2, a signal may be applied to the base of transistor Q5 through a resistor R16. A voltage divider comprising a resistor R17 and a potentiometer R18 is connected between the regulated supply lead L8 and the ground lead L3. The movable tap of potentiometer R18 is connected, through a resistor R19, to one side of the switch section SW1B, by means of the network comprising resistances R16–R19 a preselected bias current can be applied to the base of transistor Q5 along with the signal applied through the resistor R16 so that the switching threshold of amplifier 39 with respect to the input signal is effectively shifted from ground level by an amount which can be preselected by adjusting potentiometer R18.

The other side of switch section SW1B is connected to the collector of a transistor Q6 which comprises a component of a circuit indicated generally at 41. As explained hereinafter, circuit 41 provides a composite signal having an A.C. component or rider carried on a preselectable D.C. bias level. The emitter of transistor Q6 is connected to the ground lead L3 and its collector is connected to regulated supply lead L8 through a load resistor R22. The collector of transistor Q6 is also connected to its base through a capacitor C10 to suppress high frequency transients. An A.C. signal, taken from one side of the transformer secondary winding W4, is applied, through a resistor R23 and a capacitor C11, to the base of transistor Q6. A preselectable D.C. bias is also applied to the base of this transistor by a network comprising resistors R24 and R25 and a potentiometer R26 by means of which the bias level may be adjusted or preselected. The voltage at the collector of transistor Q6 thus includes an A.C. component which is an amplified version of the A.C. signal applied to the base and a D.C. component which can be adjusted by means of the potentiometer R26 which controls the bias.

The A.C. signal provided by the tachometer generator G1 is applied to an A.C. voltmeter VM which serves to indicate the speed of the output shaft 13 and is applied also to a full wave bridge rectifier comprising diodes D11–D14. The pulsating D.C. provided by the bridge rectifier is partially filtered by a resistor R30 and a capacitor C15 to obtain at a terminal T1 a composite feedback signal having a negative D.C. component the amplitude of which is substantially proportional to the speed of shaft 13 and A.C. component or rider wave. As is understood by those skilled in the art, the residual A.C. component of the signal provided by rectifying and partially filtering the A.C. supplied by the tachometer generator is of generally sinusoidal waveform and thus includes portions which are sloped, that is, portions within which the voltage changes gradually with respect to time. While the amplitude of the pulsations in the output voltage from the bridge rectifier increases as the speed of shaft 13 increases, the frequency of these pulsations also increases so that the effectiveness of the filter comprising resistor R30 and capacitor C15 increases in known manner. Accordingly, the amplitude of the A.C. component of the composite feedback signal at high output speeds is substantially the same as it is at low output speeds.

A potentiometer R32 is connected across Zener diode Z1 to provide, at teh movable tap of the potentiometer, a positive voltage which is a preselected portion of the Zener voltage. As will be apparent hereinafter, this preselected voltage constitutes a reference voltage which represents a preselected speed of the output shaft 13. This reference voltage is applied, through a resistor R33, to a mixing junction J1. The composite feedback signal provided at terminal T1 is also applied to this junction, through a resistor R34 and a rheostat R35. By mixing the reference voltage and the feedback signal in this manner, there is provided at junction J1 a composite signal having a D.C. component which varies substantially in proportion to the deviation of the actual speed of shaft 13 from the preselected speed and an A.C. component which is a predetermined portion of the A.C. component of the composite feedback signal. This composite error signal is applied to amplifier 37, i.e., directly to the base of transistor Q3, and to amplifier 39, i.e., through resistor R16 and switch section SW1B to the base of transistor Q5.

Figure 3:
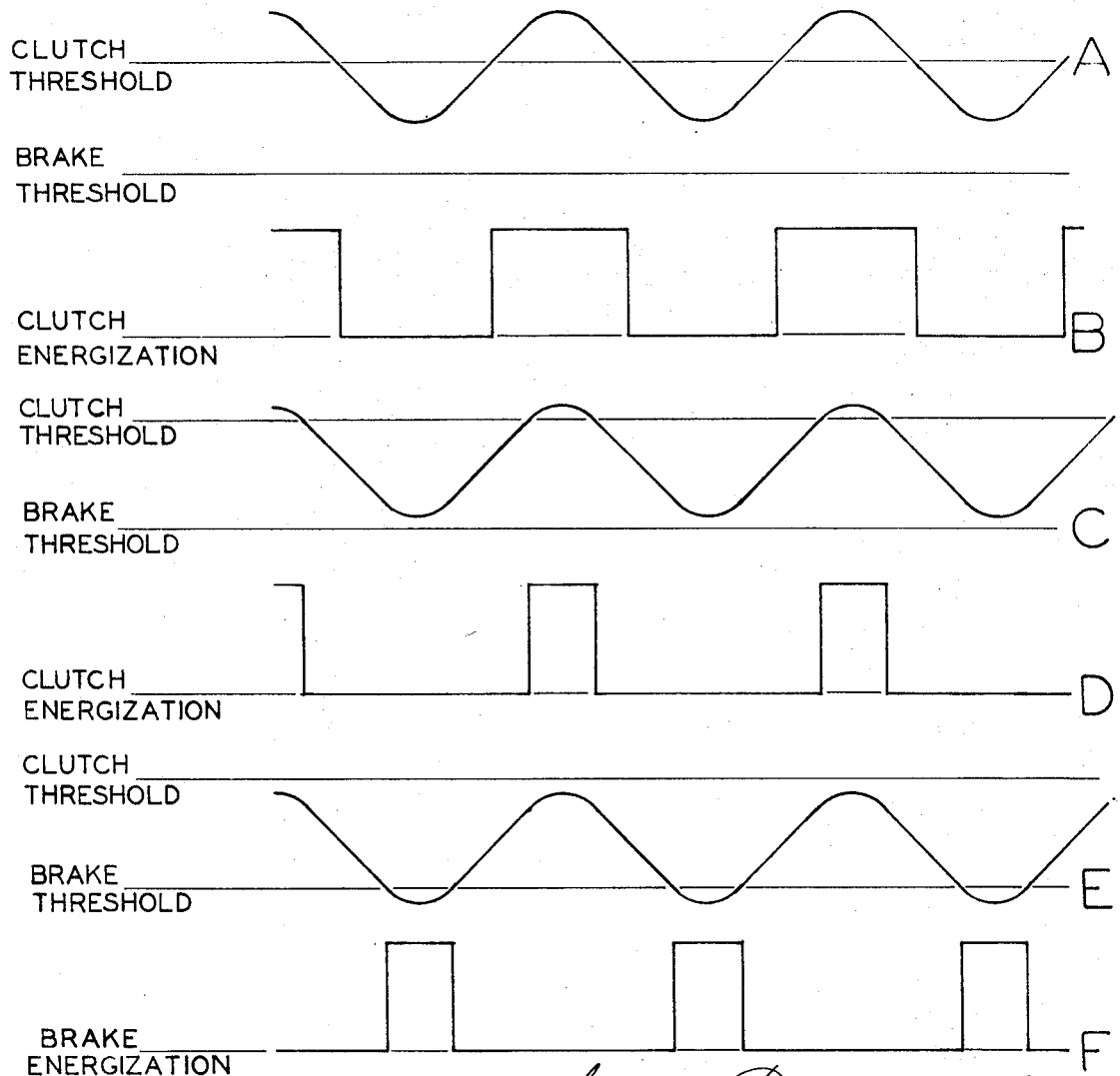
FIG. 3 represents a series fo waveforms useful in explaining the operation of the circuit of FIG. 2.

In FIG. 3, the traces A, C, and E represent the composite error signal under various conditions of operation in relation both to the threshold of the clutch amplifier which comprises transistors Q3, Q4 and Q1 and to the effective threshold of the brake amplifier comprising transistors Q5 and Q2, it being assumed that the switch sections SW1A and SW1B are in the positions illustrated. Trace A represents a normal running condition in which the system is driving a typical load requiring driving torque and the actual speed of shaft 13 is substantially equal to the desired speed. The D.C. component of the composite error signal places it nominally at the threshold of the clutch amplifier and thus the A.C. component or rider wave causes the instantaneous error signal voltage to pass repeatedly from one side of the threshold to the other. The resultant clutch energization is indicated at B, the source voltage being applied as D.C. pulses to the clutch winding W1 whenever the instantaneous value of the composite error signal is above the clutch threshold, and the width of these pulses is a function of the amplitude of the D.C. component of the composite error signal. The average voltage which is applied to the clutch is thus substantially equal to a fraction of the source voltage and thus the clutch is energized to exert a fraction of the torque it would apply if the source voltage were continuously applied.

If the speed of shaft 13 increases slightly above the desired level, the increased voltage output of the tachometer generator G1 causes the composite error signal to shift in a negative direction as indicated in trace C. Due to the slope of the portions of the sinusoidal waveform on either side of its peaks, this negative shift in the error signal causes the proportion of time during which the error signal is above the clutch threshold to be reduced. Accordingly, the proportion of time during which the source voltage is applied to the clutch winding and its average energization are reduced as illustrated in trace D, i.e., width of the D.C. pulses is reduced. The resulting reduction in the driving torque applied to inductor drum 21 tends to slow the speed of shaft 13 back to the desired level. Conversely, if the speed of the shaft 13 decreases below the desired level, the average energization of the clutch winding W1 is increased. Thus, within the range of the A.C. component of the error signal (i.e., when the composite error signal exceeds the threshold by less than a predetermined amount, viz the particular amplitude of the A.C. component thereof), a proportional clutch control is exercised in which the energization of the clutch is reduced as the speed of the shaft rises above its desired level and conversely is increased as the speed of the shaft drops below the desired level. If the output speed falls substantially below the desired level so that all portions of the A.C. component are above the clutch amplifier threshold (i.e., the composite error signal exceeds the threshold by more than the predetermined amount), the clutch is continuously energized.

If shaft 13 is subjected to an overrunning load so that its speed tends to increase above the preselected level even though the energization of the clutch is substantially reduced or cut off completely, the composite error signal shifts further in a negative direction as illustrated in trace E so that the more negative portions of the composite error signal pass below the threshold of the brake amplifier.

When the error signal passes below the brake amplifier threshold, the source voltage is applied as D.C. pulses to the brake amplifier as indicated at F. It will be seen by those skilled in the art that, due to the sloped characteristic of the A.C. component of the error signal, the width of the D.C. pulses and thus the average voltage applied to the brake will gradually increase as the error signal becomes more negative and vice versa and thus proportional control of the brake energization is also provided within the range of A.C. component level of the composite signal applied to amplifier 39. If the actual speed of the output shaft 13 falls so far below the desired level that the entire A.C. component waveform is more negative than the brake amplifier threshold (i.e., when the composite error signal falls below the brake threshold by more than a predetermined amount), the brake will, of course, be continuously energized.

By means of the potentiometer R18 which, as described previously, adjusts the effective threshold level of the brake amplifier, the relative levels of the clutch and brake amplifier thresholds may be adjusted in relation to each other. Usually it is desirable to adjust the relative levels of the thresholds so that the separation between them is substantially equal to the amplitude of the A.C. component of the error signal. Accordingly, the brake will begin to be energized just about as the cutch is deenergized and vice versa. Due to tolerances within the system, there will typically be either a slight so-called dead-band in which neither the clutch winding nor the brake winding is energized or an overlap in which both windings have some average energization. It should be noted that while such an adjustment can cause both windings to be energized on an average basis under certain conditions, the actual instantaneous applications of the source voltage occur alternately as may be seen by comparing the traces at D and F. This result follows from the fact that both the clutch amplifier 37 and the brake amplifier 39 respond to the same composite error signal, one energizing its winding when the instantaneous voltage rises above a respective predetermined threshold and the other energizing its winding when the instantaneous error voltage falls below a respective predetermined threshold.

From the foregoing, it can be seen that both the clutch and the brake winding are subjected to proportional control over a range of speeds around the desired level and therefore a very precise speed control is obtained for either overrunning or underrunning loads. The apparatus providing this operation is relatively simple and reliable and many components, particularly those which generate the controlling error signal, operate commonly to control both the clutch and the brake.

To stop the output shaft 13 under a preselected braking torque, the switch sections SW1A and SW1B are switched to their opposite positions. In this state, the clutch coil is deenergized and the brake amplifier is controlled by the signal provided at the collector of transistor Q6. As described previously this signal comprises an A.C. rider wave carried on a preselected bias. By appropriately preselecting this bias by adjustment of potentiometer R26, the average energization of the brake winding W2 and the level of braking torque may thus be conveniently preselected. Thus a controlled stop is provided.

In view of the above, it will be seen that the several objects of the invention are achieved and other advantageous results attained.

As various changes could be made in the above constructions without departing from the scope of the invention, it is intended that all matter contained in the above description or shown in accompanying drawings shall be interpreted as illustrative and not in a limiting sense.

What is claimed is:

1. Control apparatus for maintaining the speed of the output member of an eddy current coupling at a preselected level, said coupling having a clutch winding which when energized applies a driving torque to said member and a brake winding which when energized applies a braking torque to said member, said control apparatus comprising:

an A.C. tachometer generator driven by said output member for providing an A.C. signal having an amplitude which varies as a function of the speed of said output member;

means for rectifying and partially filtering said A.C. signal to supply a composite feedback signal having a D.C. component of one polarity the amplitude of which varies as a function of the speed of said output member and an A.C. rider wave;

means for providing a D.C. voltage of opposite polarity which is a function of said preselected speed level; and means for mixing said D.C. voltage and said composite feedback signal to obtain a single composite error signal having a D.C. component which varies as a function of the deviation of the actual speed of said output member from said preselected level and an A.C. component comprising a repetitive waveform having at least one portion thereof which is sloped;

means including a first amplifier means responsive to said composite error signal for applying across one of said windings D.C. pulses of a predetermined source voltage having a width which is a function of the amplitude of the of the D.C. component of said composite error signal when it exceeds a first preselected threshold by less than a predetermined amount and for applying said predetermined source voltage across said one winding when the composite error signal exceeds the first preselected threshold by more than said predetermined amount;

means including a second amplifier means responsive to said composite error signal for applying across the other of said windings D.C. pulses of a predetermined source voltage having a width which is a function of the amplitude of the D.C. component of said composite error signal when it falls below a second preselected threshold by less than a predetermined amount and for applying said predetermined source voltage across said other winding when the composite error signal falls below the second preselected threshold by more than the predetermined amount, whereby the average voltages applied to said windings vary as respective functions of the D.C. component of said composite error signal thereby to maintain the speed of said output member at said preselected level;

the responses of said amplifier means being out-of-phase with respect to each other for any given input composite error signal; and means for applying a preselected bias to the input of one of said amplifier means thereby to shift the threshold at which the respective winding is energized.

2. Apparatus as set forth in claim 1 wherein said second amplifier means energizes said brake winding and said apparatus includes means for selectively applying a control signal having an A.C. component and a D.C. component of preselectable amplitude to the input of said second amplifier for applying a preselected braking torque to said member.

3. Apparatus as set forth in claim 2 including means for deenergizing said clutch winding concurrently with applying said control signal to said second amplifier means.

4. Apparatus as set forth in claim 1 wherein said means for providing said D.C. voltage comprises a potentiometer and means for applying a regulated D.C. potential across said potentiometer thereby to provide a preselectable D.C. voltage at the tap of said potentiometer.

5. Apparatus as set forth in claim 1 wherein said means for applying voltages across said first and second windings comprise respective high gain transistor amplifiers.

6. Apparatus as set forth in claim 5 wherein one of said amplifiers comprises a three-stage, direct-coupled transistor amplifier and the other amplifier comprises a two-stage, direct-coupled transistor amplifier.

7. Apparatus as set forth in claim 1 including a diode connected across each of said windings for permitting a current in each said winding to continue flow between applications of the respective source voltage.

References Cited

UNITED STATES PATENTS

| | | | |
|---|---|---|---|
| 2,760,611 | 8/1956 | Jaeschke | 310—95 X |
| 2,809,312 | 10/1957 | Eck et al. | 310—94 |
| 3,073,977 | 1/1963 | Ames et al. | 310—95 X |
| 3,207,950 | 9/1965 | Smith | 310—95 X |
| 3,090,901 | 5/1963 | Shaw | 318—302 X |

ORIS L. RADER, Primary Examiner

T. LANGER, Assistant Examiner